United States Patent [19]

Hicks

[11] Patent Number: 4,810,197

[45] Date of Patent: Mar. 7, 1989

[54] THREE-DIMENSIONAL INSTRUCTIONAL DEVICE FOR TEACHING PHYSICAL PROPERTIES AND RELATIONSHIPS BETWEEN BASIC ELEMENTS

[76] Inventor: Alfonza Hicks, 222 Beechwood Ave., Trenton, N.J. 08618

[21] Appl. No.: 172,662

[22] Filed: Mar. 24, 1988

[51] Int. Cl.[4] ...................... G09B 23/24; G09B 23/26
[52] U.S. Cl. .................................... 434/281; 434/278
[58] Field of Search ................ 434/278, 279, 280, 281

[56] References Cited

U.S. PATENT DOCUMENTS

| | | | |
|---|---|---|---|
| 2,052,457 | 8/1936 | French | 434/278 |
| 2,085,881 | 7/1937 | Van Doren | 434/278 |
| 2,516,418 | 7/1950 | Ramsay | 434/281 |
| 2,651,115 | 9/1953 | Davies | 434/281 |
| 2,891,322 | 6/1959 | Brownlee | 434/282 |
| 2,920,401 | 1/1960 | Lennon | 434/281 |
| 3,156,985 | 9/1964 | Bliss et al. | 434/282 |
| 3,183,608 | 5/1965 | Jierree | 434/278 |
| 3,325,914 | 6/1967 | Bliss et al. | 434/278 |
| 3,390,468 | 7/1968 | Mitchell | 434/282 |
| 3,406,972 | 10/1968 | Wong | 273/118 A |
| 3,654,708 | 4/1972 | Brudner | 434/307 |
| 3,866,337 | 2/1975 | Burns | 434/281 |
| 4,568,288 | 2/1986 | Patterson | 434/366 |

Primary Examiner—MaryAnn Lastova
Assistant Examiner—V. Szczepanik
Attorney, Agent, or Firm—Sperry, Zoda & Kane

[57] ABSTRACT

A device is disclosed for demonstrating the physical properties and chemical relationships between elements which includes three-dimensional models of the individual elements positioned within a chassis preferably in the same order as they are in the periodic chart. The models are magnetized spheres having model properties to indicate the size, coloration, density and electron affinity of the corresponding basic elements. The display chassis includes a plurality of retaining positions for holding the spheres and sensors for sensing the absence of the models or spheres such that an interfacing device can withdraw information from a computerized data bank for display of information concerning the element withdrawn from the chassis on a display device. Also information concerning possible molecular combinations will be displayed thereon responsive to simultaneous absence of two of the elemental models.

20 Claims, 1 Drawing Sheet

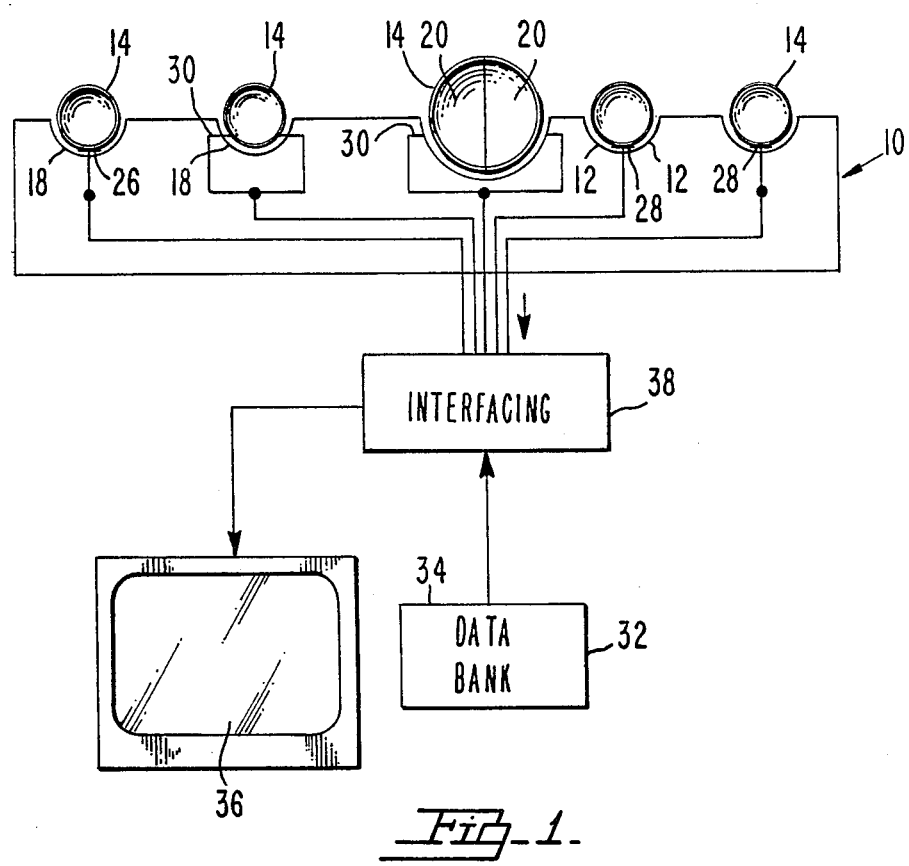
Fig_1.
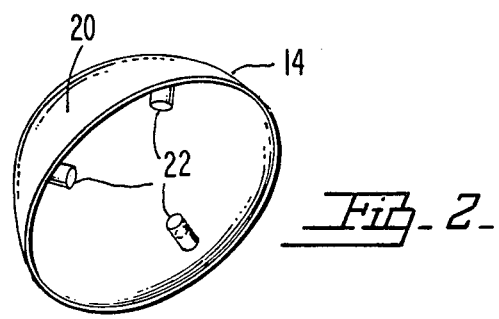
Fig_2.
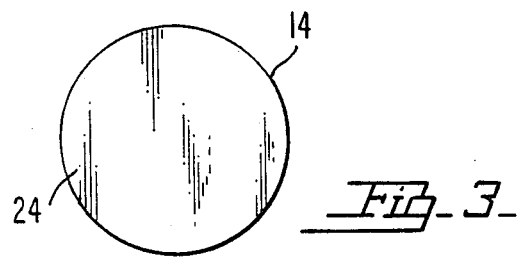
Fig_3.

THREE-DIMENSIONAL INSTRUCTIONAL DEVICE FOR TEACHING PHYSICAL PROPERTIES AND RELATIONSHIPS BETWEEN BASIC ELEMENTS

BACKGROUND OF THE INVENTION

1. Field of the Invention

The present invention deals with the field of teaching devices for use as an instructional aid for teaching the fundamental properties of basic elements of the conventional periodic chart. The present invention provides a teaching aid in an area not available heretofore since the present invention utilizes three-dimensional representations of elements to facilitate student memory of characteristics by visual aid.

2. Description of the Prior Art

There are prior art devices which have attempted to be educational with regard to molecular or basic element theory. However none have the complete characteristics available as in the present invention. Examples of such devices are shown in U.S. Pat. Nos. 2,052,457 patented Aug. 25, 1936 to S. French on an Educational Device For Teaching The Atomic And Molecular Theory Of Chemical Substances; 2,516,418 patented July 25, 1950 to B. Ramsay on an Educational Device For Visually Demonstrating Atomic Structure; 2,651,115 patented Sept. 8, 1953 to R. Davies on an Educational Device; 2,891,322 patented June 23, 1959 to R. Brownlee, Jr. on a Periodic Table Teaching Device; 2,920,401 patented Jan. 12, 1960 to K. Lennon on a Means For Demonstrating Nuclear Energy Concepts; 3,156,985 patented Nov. 17, 1964 to H. Bliss et al on a Device For Teaching Atomic Structure And The Properties Of Elements; 3,183,608 patented May 18, 1965 to R. Jierree on a Molecular Model; 3,390,468 patented July 2, 1968 to D. Mitchell on a Device For Illustrating The Atomic Structure Of Elements; 3,406,972 patented Oct. 22, 1968 to A. Wong on an Educational Game Employing Magnetic Attraction; 3,654,708 patented Apr. 11, 1972 to H. Brudner on a Computer-Assisted Instruction Via Video Telephone; 3,866,337 patented Feb. 18, 1975 to T. Burns on an Apparatus For Demonstrating Atomic Structure; and 4,568,288 patented Feb. 4, 1986 to M. Patteson on a System And A Method To Visually Simulate Subsystems In A Fossil Fuel Power Plant Simulator.

SUMMARY OF THE INVENTION

The present invention provides a three-dimensional instructional aid for teaching physical properties in chemical relationships between basic elements which includes a chassis defining an array or pattern of elemental model retaining stations thereon. Each elemental retaining station corresponds to a different individual basic element. Preferably the stations are organized in the array on the chassis in the format of the conventional periodic chart.

A plurality of elemental models are included with each representing a different individual basic element. The elemental models each correspond with one of the elemental model retaining stations associated with the basic element so represented by the model.

A plurality of model sensing means are positioned adjacent to each of the elemental model retaining stations and are adapted to sense whether the elemental model corresponding to the elemental model retaining station is positioned therein or not.

Preferably the elemental model retaining stations comprise model receiving holes adapted to receive the models therein for retainment. Furthermore preferably the elemental models themselves are each magnetized to a magnitude and polarity of charge proportional to an ion of the basic element being represented thereby.

Preferably each of the elemental models comprises two hollow hemispherical halves which are detachably securable with respect to one another. At least one magnetic means is preferably detachably secured within the hollow interior thereof to facilitate correspondence with the polarity and magnitude of electrical charge of an ion of the basic element being represented by the elemental model.

Preferably each of the elemental models are proportional in density to the other of said elemental models as is the proportional relationship of densities of their corresponding basic elements. Furthermore the elemental models are preferably colored to match the coloration of the corresponding basic element. Furthermore the external surface of the elemental models can be coated to indicate specific characteristics of the corresponding basic element. Each of the elemental models is furthermore of a size proportional to the size of the other of the elemental models as is the proportional relationship between sizes of their corresponding basic elements.

The external surface of some of the elemental models may include a metallic layer to indicate the corresponding basic element is a metal. Similarly, the external surface of some of the elemental models will include a non-metallic layer to thereby indicate that the corresponding basic element is a non-metal.

A plurality of model sensing means are positioned within each of the elemental model retaining stations and is adapted to sense whether the elemental model corresponding to the elemental model retaining station is positioned therein. Each of these model sensing means can comprise a pressure sensitive contact switch means or a photoelectric switch means positioned within each of the elemental model retaining stations in such a manner as to be adapted to be normally close responsive to the corresponding elemental model being positioned therein. Furthermore the switch is adapted to be moved to the opened position responsive to removal of the elemental model from its corresponding elemental model retaining station.

A data bank may be included which contains informational data concerning all individual elements contained in the array of elemental models and informational data on possible molecular combinations thereof. The data bank may comprise a computer data storage file.

A display means is included for displaying information retrieved from the data bank. The display means may preferably be a conventional cathode ray tube.

A retrieval interfacing device is operatively connected with respect to the model sensing means and with respect to the data bank and the display means. This retrieval interfacing means is adapted to sense the absence of an elemental model from one of the elemental model retaining stations to thereby withdraw information on the corresponding basic element from the data bank and transmit same for display on the display device. The retrieval interfacing means is further responsive to sense the absence of more than one ornamental model from the elemental model retaining stations to thereby withdraw information concerning possible molecules capable of being formed by various combinations of the elements corresponding therewith for display of this information upon the display means.

It is an object of the present invention to provide a three-dimensional instructional device for teaching physical properties and relationships between basic elements wherein a computerized display means is utilized to indicate properties of elements or molecules currently being worked with.

It is an object of the present invention to provide a three-dimensional instructional device for teaching physical properties and relationships between basic elements wherein individual models are provided for each basic element of the periodic chart.

It is an object of the present invention to provide a three-dimensional instructional device for teaching physical properties and relationships between basic elements wherein electro-magnetic properties of ions of the basic elements are represented by magnetic properties of the model.

It is an object of the present invention to provide a three-dimensional instructional device for teaching physical properties and relationships between basic elements wherein oppositely charged models will attract and commonly charged articles will repel.

It is an object of the present invention to provide a three-dimensional instructional device for teaching physical properties and relationships between basic elements wherein the individual models of the basic elements are formed of two hollow hemispherical members which can be separated to adjust the magnetic means positioned therein.

It is an object of the present invention to provide a three-dimensional instructional device for teaching physical properties and relationships between basic elements wherein external coating means on the models indicate specific characteristics or properties of the basic element.

It is an object of the present invention to provide a three-dimensional instructional device for teaching physical properties and relationships between basic elements wherein sensing means are associated with each retaining hole on a chassis for sensing the removal of basic elements by a user.

It is an object of the present invention to provide a three-dimensional instructional device for teaching physical properties and relationships between basic elements wherein an interfacing means is responsive to the removal of a specific element to withdraw basic physical properties and chemical relationships thereof for display upon a display means.

It is an object of the present invention to provide a three-dimensional instructional device for teaching physical properties and relationships between basic elements wherein removal of more than one model of a basic element from the chassis is sensed by the interfacing means to display possible molecular combinations thereof.

It is an object of the present invention to provide a three-dimensional instructional device for teaching physical properties and relationships between basic elements wherein basic costs are minimized.

It is an object of the present invention to provide a three-dimensional instructional device for teaching physical properties and relationships between basic elements wherein maintenance is minimized.

It is an object of the present invention to provide a three-dimensional instructional device for teaching physical properties and relationships between basic elements wherein audio-visual instructional impact is maximized.

It is an object of the present invention to provide a three-dimensional instructional device for teaching physical properties and relationships between basic elements wherein the basic carrying chassis can be formed of a lightweight durable plastic.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

FIG. 1 is a schematic illustration of an embodiment of the three-dimensional instructional device for teaching physical properties and relationships between basic elements of the present invention;

FIG. 2 is a perspective illustration of an embodiment of an elemental model of the present invention; and FIG. 3 is a front plan view of an elemental model of the present invention showing a metallic outer coating to illustrate the basic element corresponding thereto being a metal.

DETAILED DESCRIPTION OF THE PREFERRED EMBODIMENT

The three-dimensional instructional device for teaching physical properties and relationships between basic elements described in the present invention includes a chassis means 10 which is preferably of a plastic material. Chassis 10 defines an array of receptacles 12 of elemental model retaining station 16.

Each elemental model retaining station 16 is adapted to receive an elemental model 14 therein. Preferably the retaining or receiving station 16 comprises model receiving holes 18.

Each elemental model 14 preferably is formed of two hollow hemispherical halves 20 which are detachably securable with respect to one another. A plurality of individual magnetic means 22 are capable of being positioned within the hollow interior surface of the hemispherical halves 20 of models 14. The positioning and size of magnetic means 22 will determine the overall magnitude and polarity of magnetic interaction of the elemental model 14. This interaction should correspond to the interactive characteristics of the basic element corresponding to the elemental model 14.

If the basic element corresponding to a particular elemental model 14 is a metal then preferably the external surface of the elemental model 14 will include a metallic layer 24. Other characteristics or coatings can be included in the elemental model 14. For example the density of the model 14 can correspond to the density of the basic element to which it corresponds. Similar correspondence can be made for coloration, size, density, magnetic interaction qualities and other characteristics which are desired to be taught by the present instructional aid.

A model sensing means 26 will be positioned within each of the elemental model retaining stations 16. The model sensing means can take the form of a pressure sensitive contact switch means 28 or a photoelectric sensing means 30. Either of these two types of switches will function in a completely efficient manner as the model sensing means 26.

A retrieval interfacing means 38 is operatively secured with respect to the model sensing means 26 in order to provide information as to which elemental models 14 have been removed from the model receiving holes 18. Removal of the elemental models 14 will cause actuation of the model sensing means 26 associated with that receiving hole 18 and therefore will send the signal to the retrieval interfacing means 38.

Interfacing means 38 is operatively secured with respect to a data bank means 32 and separately with respect to a display means 36 which preferably is a cathode ray tube.

Upon sensing the removal of an elemental model 14 from a model receiving hole 18 the retrieval interfacing means 38 will immediately withdraw information on the basic element corresponding to that elemental model and will display same upon display means 36. If more than one elemental model 14 is removed from the retaining station 16 the retrieval interfacing means 38 can withdraw information on both basic elements corresponding to the two elemental models 14 currently absent from the holes 18 as well as displaying information on possible molecular combinations thereof. This is a great deal of information to be stored within the data bank means 32 and as such preferably this bank means will comprise a computer data storage file 34 which can be accessed by a computerized retrieval interfacing means 38.

A great number of different characteristics of the basic elements can be shown on the elemental model 14 such as electronic charge, coloration, size, density and metallic or non-metallic qualities. The basic relationship between elements will be maintained as the same basic relationships between the elemental models 14. Therefore an ion with a $-1$ charge will be chosen as the unitary charge and another ion having a $-2$ charge will be chosen of the same polarity but twice the magnitude. On the other hand a basic element having an ion with a $+1$ charge will be chosen to have the same magnitude as the $-1$ charge but of opposite polarity.

The same interrelationships between the elemental models 14 can be achieved with respect to other characteristics such as size. A basic element which has a single ion 50% larger in size than another ion can have its elemental model 14 50% larger in size than the elemental model 14 corresponding to the smaller ion. The same basic relationship can be established with respect to density.

Other characteristics can be displayed by a particular coating on the models 14 such as the normal state at room temperature. For example perforations in the external surface of the elemental models 14 can indicate that the basic element naturally occurs in a gaseous state at ambient temperature and pressure. Furthermore the outer shell of an elemental model 14 would be corresponding to, for example, Chlorine would be made of a non-metallic color having perforations and would be of a green-yellow color since chlorine is a non-metal yellow-green gas. The perforations in the sphere would indicate the gaseous state of Chlorine at ambient temperature and pressure and the yellow-green color would show the color of chlorine gas. Furthermore the non-metallic marking making up the outer shell would indicate that Chlorine is a non-metal element.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

I claim:

1. A three-dimensional instructional device for teaching physical properties and relationships between basic elements comprising:
    (a) a chassis means defining an array of elemental model retaining stations, each station corresponding to a different individual basic element;
    (b) a plurality of elemental models with each representing a different individual basic element, each elemental model corresponding with one of said elemental model retaining stations;
    (c) a plurality of model sensing means positioned adjacent to each of said elemental model retaining stations and adapted to sense whether said elemental model corresponding with said elemental model retaining station is positioned therein;
    (d) data bank means containing informational data concerning all individual elements contained in the array of elemental models and informational data on possible molecular combinations thereof;
    (e) display means; and
    (f) retrieval interfacing means being operatively connected with respect to said model sensing means, said data bank means and said display means; said retrieval interfacing means adapted to sense the absence of an elemental model from one of said elemental model retaining stations to withdraw information on the corresponding basic element from said data bank means and transmit same for display on said display means, said retrieval interfacing means being further responsive to sense the absence of more than one elemental model from said elemental model retaining stations to withdraw information concerning the possible molecules capable of being formed by the combinations of the elements corresponding therewith for display of this information upon said display means.

2. A three-dimensional instructional device for teaching physical properties and relationships between basic elements as defined in claim 1 wherein each of said model sensing means comprises a contact switch means positioned within each of said elemental model retaining stations being adapted to be normally closed responsive to said corresponding elemental model being positioned therein and to be opened responsive to removal of said elemental model from its corresponding elemental model retaining station.

3. A three-dimensional instructional device for teaching physical properties and relationships between basic elements as defined in claim 1 wherein each of said model sensing means comprises a photoelectric switch means positioned within each of said elemental model retaining stations being adapted to be normally closed responsive to said corresponding elemental model being positioned therein and to be opened responsive to removal of said elemental model from its corresponding elemental model retaining station.

4. A three-dimensional instructional device for teaching physical properties and relationships between basic elements as defined in claim 1 wherein said elemental models are magnetized to correspond to the magnitude and polarity of charge of an ion of the basic element being represented.

5. A three-dimensional instructional device for teaching physical properties and relationships between basic elements as defined in claim 4 wherein said elemental models are hollow and include at least one magnetic means secured therein to correspond to the polarity and magnitude of electrical charge of an ion of the basic element being represented by said elemental model.

6. A three-dimensional instructional device for teaching physical properties and relationships between basic elements as defined in claim 5 wherein said magnetic means are detachably securable within the hollow interior of said elemental models.

7. A three-dimensional instructional device for teaching physical properties and relationships between basic elements as defined in claim 5 wherein each of said elemental models comprise two hollow hemispherical halves being detachably securable with respect to one another to facilitate detachable securement of said magnetic means therein.

8. A three-dimensional instructional device for teaching physical properties and relationships between basic elements as defined in claim 1 wherein said chassis means is made of plastic.

9. A three-dimensional instructional device for teaching physical properties and relationships between basic elements as defined in claim 1 wherein each of said elemental model retaining stations comprises model receiving holes adapted to receive therein said elemental models for retainment.

10. A three-dimensional instructional device for teaching physical properties and relationships between basic elements as defined in claim 1 wherein each of said elemental models is proportional in density to the other of said elemental models as is the proportional relationship of the densities of the corresponding basic elements.

11. A three-dimensional instructional device for teaching physical properties and relationships between basic elements as defined in claim 1 wherein each said elemental model is colored corresponding to the coloration of its corresponding basic element.

12. A three-dimensional instructional device for teaching physical properties and relationships between basic elements as defined in claim 1 wherein the external surface of each elemental model is coded to indicate specific characteristics of the corresponding basic element.

13. A three-dimensional instructional device for teaching physical properties and relationships between basic elements as defined in claim 12 wherein the external surface of some of said elemental models includes a perforated layer to indicate the corresponding basic element to be gaseous at room temperature.

14. A three-dimensional instructional device for teaching physical properties and relationships between basic elements as defined in claim 12 wherein the external surface of some of said elemental models includes a metallic layer to indicate the corresponding basic element to be a metal.

15. A three-dimensional instructional device for teaching physical properties and relationships between basic elements as defined in claim 12 wherein the external surface of some of said elemental models includes a non-metallic layer to indicate the corresponding basic element to be a non-metal.

16. A three-dimensional instructional device for teaching physical properties and relationships between basic elements as defined in claim 1 wherein said display means comprises a cathode ray tube.

17. A three-dimensional instructional device for teaching physical properties and relationships between basic elements as defined in claim 1 wherein said array on said chassis means defines one of said elemental model retaining stations for each of the basic elements of the conventional chemical periodic chart.

18. A three-dimensional instructional device for teaching physical properties and relationships between basic elements as defined in claim 1 wherein said data bank means comprises a computer data storage file.

19. A three-dimensional instructional device for teaching physical properties and relationships between basic elements as defined in claim 1 wherein each said elemental model is sized proportional to the size of the other of said elemental models as is the proportional relationship between the sizes of their corresponding basic elements.

20. A three-dimensional instructional device for teaching physical properties and relationships between basic elements comprising:
(a) a chassis means of plastic material defining an array of elemental model retaining stations, each station corresponding to a different individual basic element, said array on said chassis means defining one of said elemental model retaining stations for each of the basic elements of the conventional chemical periodic chart, each of said elemental model retaining stations comprising a model receiving hole adapted to receive said elemental models therein for retainment thereof;
(b) a plurality of elemental models with each representing a different individual basic element, each one of said elemental models corresponding with one of said elemental model retaining stations, each of said elemental models being magnetized to correspond to the magnitude and polarity of charge of an ion of the basic element being represented, each of said elemental models comprising two hollow hemispherical halves being detachably securable with respect to one another, said elemental models including at least one magnetic means detachably secured within the hollow interior thereof to facilitate correspondence with the polarity and magnitude of the electrical charge of an ion of the basic element being represented by said elemental model, each of said elemental models being colored corresponding to the color of its corresponding basic element, the external surface of each of said elemental models being coded to indicate specific characteristics of the corresponding basic element, the external surface of some of said elemental models including a metallic layer to indicate the corresponding basic element to be a metal, the external surface of some of said elemental models including a non-metallic layer to indicate the corresponding basic element to be a non-metal, each of said elemental models being proportional in density to the other of said elemental models as is the proportional relationship of the densities of the corresponding basic elements, each of said elemental models being sized proportional to the size of the other of said elemental models as is the proportional relationship between the sizes of their corresponding basic elements;
(c) a plurality of model sensing means positioned within each of said elemental model retaining stations and adapted to sense whether said elemental model corresponding with said elemental model retaining station is positioned therein, each of said model sensing means comprising a pressure sensitive contact switch means positioned within each of said elemental model retaining stations and being adapted to be normally closed responsive to said corresponding elemental model being positioned therein and to be opened responsive to removal of said elemental model from its corresponding elemental model retaining station;

(d) data bank means containing informational data concerning all individual elements contained in the array of elemental models and informational data on possible molecular combinations thereof, said data bank means including a computer data storage file;

(e) display means comprising a cathode ray tube; and (f) retrieval interfacing means being operatively connected with respect to said model sensing means, said data bank means and said display means, said retrieval interfacing means adapted to sense the absence of an elemental model from one of said elemental model retaining stations to withdraw information on the corresponding basic element from said data bank means and transmit same for display on said display means, said retrieval interfacing means being further responsive to sense the absence of more than one elemental model from said elemental model retaining stations to withdraw information concerning the possible molecules capable of being formed by the combinations of the elements corresponding therewith for display of this information upon said display means.

* * * * *